July 21, 1953 F. J. MARCO 2,646,513

TELEVISION TUNER

Filed Jan. 24, 1950 4 Sheets-Sheet 1

INVENTOR.
Frederick J. Marco,
BY Brown, Jackson,
Boettcher & Dienner
attys.

July 21, 1953 F. J. MARCO 2,646,513

TELEVISION TUNER

Filed Jan. 24, 1950 4 Sheets-Sheet 2

INVENTOR.
Frederick J. Marco,
BY Brown, Jackson,
Boettcher & Dienner
Attys

INVENTOR.
Frederick J. Marco,
BY Brown, Jackson,
Boettcher & Dienner
Attys.

INVENTOR.
Frederick J. Marco,
BY Brown, Jackson,
Boettcher & Dienner
Attys

Patented July 21, 1953 2,646,513

UNITED STATES PATENT OFFICE 2,646,513

TELEVISION TUNER

Frederick J. Marco, Des Plaines, Ill.

Application January 24, 1950, Serial No. 140,332

2 Claims. (Cl. 250—40)

The present invention relates to television apparatus, and is concerned primarily with the channel selecting tuning apparatus of a television receiver.

The matter of channel selection in television receivers has been and still is a serious problem to the development of the industry for two primary reasons. The first reason is the fear, either real or fancied, in the minds of a large part of the public, that any television receiver which they may buy now is likely to become antiquated, outmoded or obsolete by the opening of new channels (in addition to the present 12 channels), in the near future, such as in the ultrahigh frequency black and white field, and also possibly by the commercial advent of color television. The second reason why present forms of channel selecting apparatus have been a problem in the television field is the unwarranted expense of constructing every television receiver so that it is capable of receiving programs over the entire number of television channels now operating, even though there is no geographical area in the country now operating upon all of these channels, and in fact in a large number of geographical areas there is only one or two channels now operating. The expense of equipping the television receiver for reception on, say, twelve different channels, where only two, three or four channels are available for use in the purchaser's locality, imposes an unwarranted expense upon that purchaser in the buying of his set.

The general object of the present invention is to avoid these complications and difficulties regarding channel selection by so constructing the television receiver that the purchaser himself can add new channels, substitute different channels or subtract unused channels in his receiver at any time without the assistance of a service man or the necessity of sending the receiver to a service station or factory, or even opening up the receiver safety-screen or chassis. Thus, the television set can be manufactured and distributed without having all or any of the channel selecting tuning elements embodied therein. This enables the selling price of the set to be reduced to a lower figure, based upon a stock assembly or chassis which does not burden any purchaser with the expense of paying for receiving channels which he does not or cannot use. At the time of purchase, the television set can be provided with the one or more channel selecting tuning elements which correspond to the specific channels that are receivable in the locality where the set is to be used; or the purchaser himself can insert the appropriate tuning elements for reception on the channels available in his area. As additional channels are opened up in his locality, the owner of the set merely buys the additional channel selecting tuning elements appropriate to those channels and simply inserts them in his own set, through a small opening in the cabinet or safety-screen, without requiring the assistance of a service man or the shipment of the receiving set back to a service station or factory.

In accordance with the foregoing, one of the more specific objects of the invention is to provide an improved construction of channel selecting tuner having tuning element sockets or receptacles therein arranged for convenient accessibility from the exterior of the receiving set, so that the set owner can quickly and easily insert different tuning elements into these sockets or receptacles from the exterior of the set.

Another object is to provide an improved keying relation between the receiving sockets and the individual tuning elements to be inserted into these sockets, whereby the tuning elements cannot be improperly inserted, and whereby they will be positively retained in one position in the sockets after insertion therein. Each tuning element is preferably in the form of a cartridge, similar in appearance to a cartridge fuse, and has a plurality of tuning coils therein, the terminals of which extend to a plurality of terminal contacts mounted on the exterior of the cartridge. In the preferred embodiment of the invention, the tuner comprises a manually rotatable carrier, such as a turret, around the periphery of which are provided the aforesaid sockets or receptacles for receiving the readily insertable tuning elements. As this turret is manually rotated from channel to channel, the terminal contacts mounted on the exterior surfaces of the tuning elements are successively presented to a predetermined circuit closing position, where they engage with stationary contacts adapted to connect the selected tuning elements into circuit with the tuning end of the television receiver circuit. The above described keyed relation assures that the user will always insert each tuning element cartridge in proper position to have its terminal contacts engage these relatively stationary circuit closing contacts in the movement of the tuning carrier.

In other embodiments hereinafter described, I disclose how my invention may employ a movable carrier having a rectilinear instead of a rotary motion, or may employ a stationary carrier utilizing manually actuated switching gear for effecting channel selection instead of motion of the carrier. Each of these modified embodiments has the externally accessible sockets for the quick and easy insertion of different tuning elements or cartridges.

Another object is to provide an improved arrangement of removing tool to facilitate removing the tuning element cartridges from the receiving sockets in the movable or stationary carrier.

Another object is to provide improved cleaning cartridges carrying cleaning surfaces or a cleaning medium for cleaning the active surfaces of the stationary circuit closing contacts which are engaged by the cartridge contacts.

Other objects, features and advantages of the invention will be apparent from the following detailed description of certain preferred embodiments of the invention. In the accompanying drawings illustrating such embodiments:

Figures 1, 2, 3:
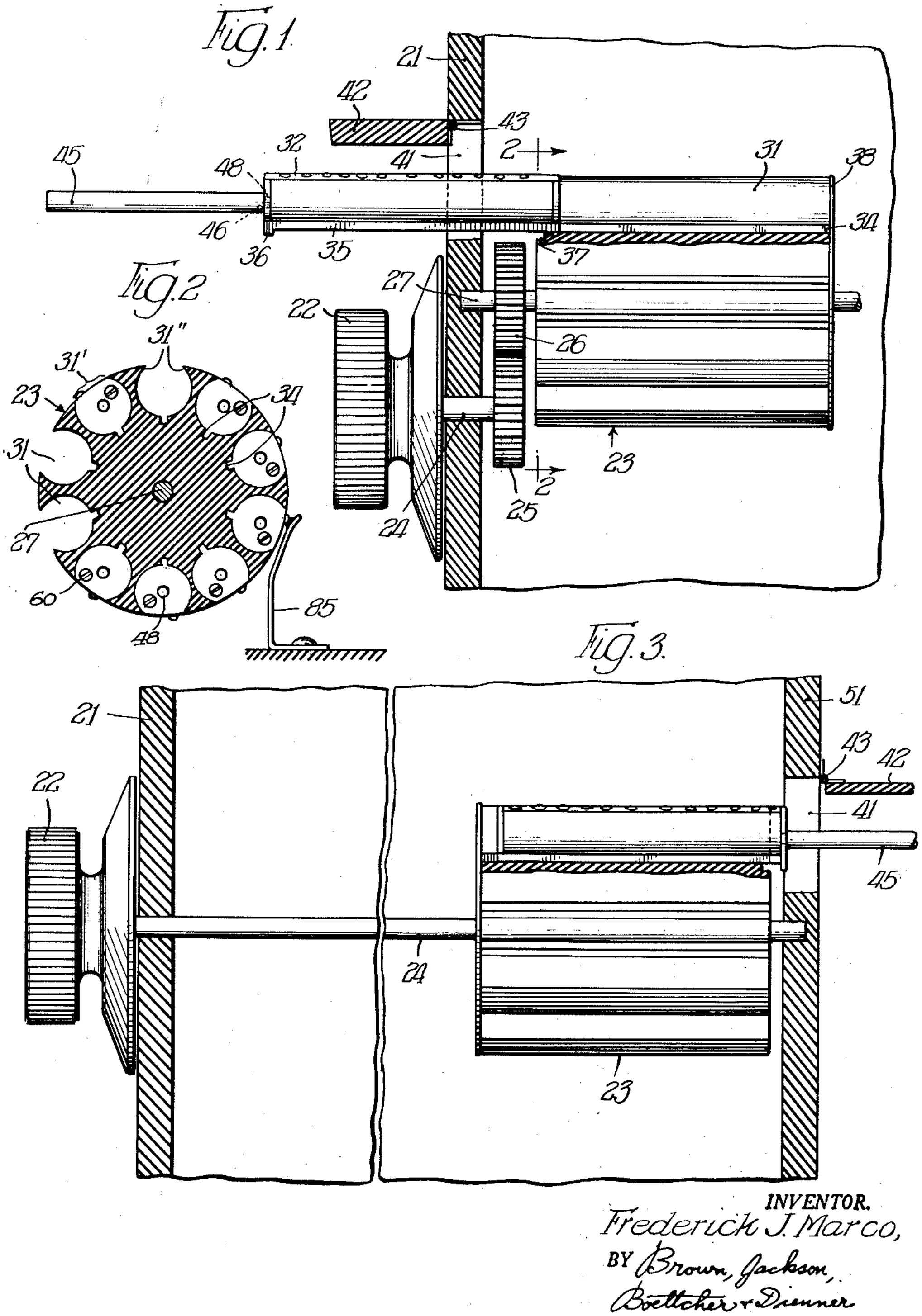
Figure 1 is a fragmentary sectional view taken transversely through the front panel of a television cabinet, showing one embodiment of my improved tuning turret arranged to be gear driven from the front tuning knob, and illustrating one of the tuning cartridges being inserted into or removed from one of the turret sockets through a front opening in the cabinet.
Figure 2 is a transverse sectional view through this tuning turret, corresponding to the section taken approximately on the plane of the line 2—2 of Figure 1.
Figure 3 is a view somewhat similar to Figure 1, but illustrating a modified construction wherein the turret is disposed at the rear of the cabinet for the insertion of the tuning cartridges through an access opening at the rear of the cabinet.

Referring first to Figures 1 and 2, the partition 21 is intended to represent the instrument panel or front wall of a television cabinet. Mounted upon the front side of this front wall 21 is a rotatable tuning knob 22 for channel selection tuning. The knob is arranged to rotate a tuning turret or drum 23 mounted inside of the cabinet 21. In order to make the periphery of the turret readily accessible at one point beyond the periphery of the tuning knob, I propose to mount the turret on an axis offset from the axis of the tuning knob. In such arrangement, the shaft 24 of the knob carries a spur gear 25 which meshes with a spur gear 26 mounted upon the shaft 27 of the turret 23. This eccentric relation between the tuning knob and the tuning turret disposes the periphery of the turret substantially beyond the periphery of the knob at one point, so as to facilitate the introduction of the tuning elements into the turret at this point.

As shown in Figure 2, the turret is formed with a plurality of receiving sockets or receptacles 31 spaced equidistantly around its periphery. The tuning elements or self-contained tuning units adapted for reception in these sockets 31 are indicated at 32. In the embodiment of the invention illustrated in Figures 1 and 2, these tuning elements 32 have endwise insertion into the ends of the sockets 31 through one end of the turret 23. In such embodiment, the sockets 31 are set back into the body of the turret sufficiently so that the longitudinal opening 31′ of each socket is of narrower width than the inside width of the socket. The effect of this is that the converging edges 31″ of each socket function as overhanging retaining flanges for positively preventing outward displacement of the tuning elements 32 in a radial direction from the turret. Each tuning element 32 is also held against any rotative displacement within the socket 31 by the provision of a longitudinal keyway 34 in the bottom of each socket, and by the provision of a longitudinal key 35 along the back side of each tuning element for reception in this keyway. In order to distinguish between the outer end and the inner end of each tuning element 32, the key 35 has a radially projecting blocking lug 36 at its outer end. This blocking lug 36 cannot enter and slide through the entire length of the keyway 34, and hence its presence assures that the inner end of the tuning element will be properly inserted into the socket 31, as clearly shown in Figure 1. Each blocking lug 36 may be arranged to bear against the outer end wall of the turret 23, or a small recess 37 may be provided at the outer end of the keyway 34 for receiving this blocking lug 36. The inner end of the turret 23 may be provided with an end head 38 for limiting the inward insertion of the tuning elements into their respective sockets; or the engagement of the blocking lugs 36 in the recesses 37 may be relied upon to limit the inward motion of the tuning elements.

In order that the owner of the television set can insert these tuning elements himself without the assistance of a service man, and without the necessity of opening the cabinet or chassis, the tuning elements are adapted to be inserted into the turret sockets through an access opening 41 provided in the wall or panel 21 of the television cabinet. This access opening is located directly in line with that peripheral portion of the tuning turret 23 that projects beyond the periphery of the the tuning knob 22. This access opening 41 is normally closed by a movable closure 42, preferably in the form of a hinged cover, trap door or the like, which is connected to the cabinet wall by a hinge 43, which may be of the concealed type in those situations where the presence of the trap door is to be as inconspicuous as possible.

The insertion and removal of the tuning elements 32 may be facilitated by the use of a tool, such as is indicated at 45. Such tool is preferably in the form of a rod having a threaded shank 46 at its inner end adapted for screw threaded reception within threaded openings 48 formed in the outer ends of the tuning elements. Such a tool is of particular use when it is desired to remove one of the tuning elements, which may be difficult of access to the fingers reaching through the opening 41, but which can readily be removed by screwing the threaded shank 46 into the tapped opening in the end of the tuning element and then pulling outwardly on the rod 45.

In Figure 3, I have illustrated a modified embodiment of the invention, which differs from the embodiment shown in Figure 1, principally in that the tuning turret 23 is disposed adjacent the back wall or safety screen 51 of the television cabinet or enclosure, so that the tuning elements are adapted to be inserted into the turret through this back wall or safety screen. In such embodiment, the turret 23 can be mounted directly upon the shaft 24 of the tuning knob 22, if desired. The access opening 41 in this back wall or safety screen 51 is arranged to be closed by the hinged cover 42, or other suitable type of closure, and the tuning elements are adapted to be inserted into or removed from the tuning turret through this access opening 41 in the same manner as described above.

Referring now to Figures 4 to 8, inclusive, illustrating the detailed construction of one preferred embodiment of my removable tuning element, each tuning element comprises a cartridge-shaped casing 52, preferably composed of a suitable insulating material, such as a phenolic condensation product, plastic or the like, or of metal. The registration key 35 is preferably a metallic bar imbedded in, or otherwise secured, to the casing 52, although it might be formed as an integral rib on the under side of the casing. The top or outer surface of the cartridge is preferably formed on a larger radius arc, substantially of the same radius as the peripheral surface of the tuning turret 23, so that when the tuning elements are inserted into the receiving sockets 31 their outer surfaces 53 will all lie substantially flush with the cylindrical outer surface of the tuning turret. Access to the interior of the cartridge element is afforded through a longitudinal opening 56 formed in this outer surface 53 and extending the entire length of the cartridge. This opening is normally closed by a cover 57 which has the curvature of the surface 53. End tongues 58 on the cover engage in notches 59 formed in the end walls 61 of the cartridge. The threaded socket 48 for receiving the tool 45 is formed in the outer end wall 61.

The tuning inductances usually comprise groups of coils arranged in the left hand end and right hand end of the cartridge, and these two groups of coils may be separated by a metallic shield 64 dividing the interior of the cartridge, if desired. This shield is shown as being secured in place by a screw 64'. As exemplifying one typical arrangement, I have illustrated two antenna coils 65 and 66 wound on an insulating coil form 67 which is mounted in the compartment space to the right of the metallic shield 64. In the other compartment space to the left of the shield 64, three interstage coils 70, 71 and 72 are mounted on a coil form 73 suitably supported in the cartridge. The end terminals and tap of the two antenna coils 65 and 66 extend to a row of five contact terminals 74, 75, 76, 77 and 78 mounted in the cover 57, and the end terminals of the three interstage coils 70, 71 and 72 are connected to a row of six contact terminals 79, 80, 81, 82, 83 and 84 also mounted in the cover 57 at the other end of the cartridge. The screw 64' for the shield 64 may be connected to an additional contact button or terminal for grounding purposes. Each cartridge may be provided with an individual fixed-variable tuning adjustment actuable from the exterior of the cartridge through a rotatable screw 60 in the end of the cartridge.

These tuning cartridge contacts 74—78 and 79—84 are adapted to engage with stationarily mounted circuit completing contact springs 85 (Figure 2) which are stationarily mounted adjacent to the turret for successive engagement by the contacts of each tuning cartridge as the turret is revolved from one channel selecting position to another. These stationary contact springs are connected to the tuning end or front end of the television circuit, as will be later described in connection with Figure 14.

Figures 4, 5, 6, 7, 8, 9, 10, 11, 12, 13, 14:
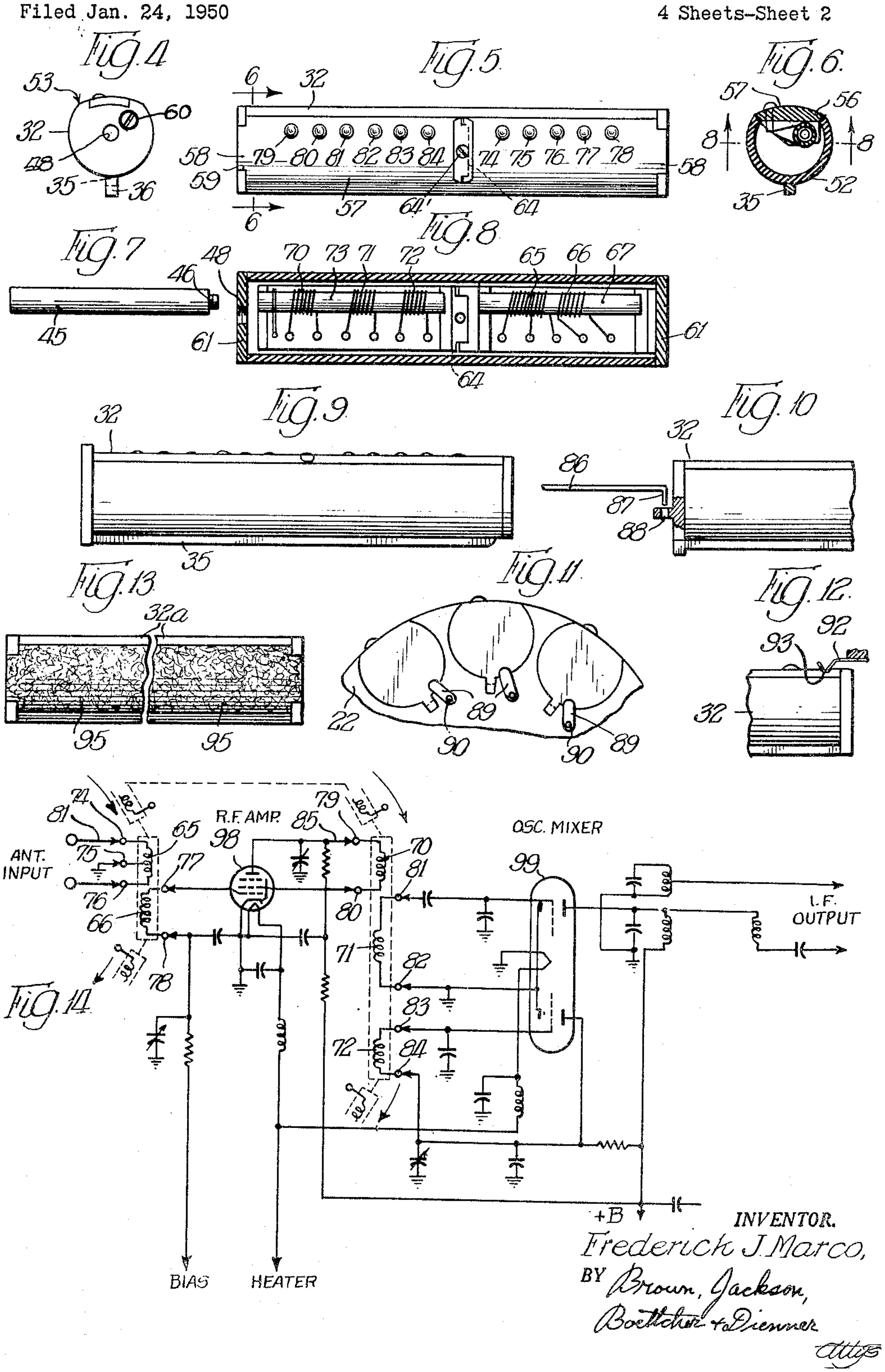
Figure 4 is an end view of one of the tuning cartridges.
Figure 5 is a plan view of the outer face of the cartridge which carries the terminal contacts.
Figure 6 is a transverse sectional view through the cartridge, taken on the plane of the line 6—6 of Figure 5.
Figure 7 is an elevational view of a tool which may be employed to facilitate the insertion and removal of the tuning cartridges.
Figure 8 is a longitudinal sectional view through one of these tuning cartridges, corresponding to a section taken on the plane of the line 8—8 of Figure 6.
Figure 9 is a side elevational view of one of the tuning cartridges.
Figure 10 is a fragmentary end view illustrating a modified arrangement of tool for inserting and removing the cartridges.
Figure 11 illustrates an arrangement of detent clips for retaining the cartridges in their sockets.
Figure 12 is a fragmentary side view of a cartridge retaining spring clip.
Figure 13 is a fragmentary plan view of a special cleaning type of cartridge.
Figure 14 is a fragmentary circuit diagram of the tuning end of a television receiver circuit, for the purpose of showing where the tuning cartridges establish connection with the input end of the circuit.

Figure 10 illustrates a modified tool arrangement which may be employed for inserting and removing the cartridges. In this arrangement, the tool 86 has an angularly bent hook 87 at its inner end which is adapted to hook into an apertured lug 87 provided at the outer end of the tuning cartridge. This hook-shaped tool enables the cartridges to be inserted and removed in substantially the same manner as described above, and if such tool should become lost, an adequate duplicate thereof could easily be made by bending a hook end on a short length of wire or rod.

In Figure 11, I have illustrated the provision of detent clips 89 pivoted at 90 to the outer end of the turret adjacent each of the receiving sockets 31. These detent clips are swung to a position out of line with the sockets when the tuning cartridge is to be inserted into the socket, and thereafter the clip is swung back into operative position to overlie the end of the cartridge so that it cannot accidentally work back out from the outer end of the socket.

In Figure 12, I have illustrated the provision of spring detents 92 mounted at the inner end of the turret substantially in line with each socket 31 for snapping down into notches 93 in the inner ends of the tuning cartridges 32. These spring detent fingers releasably hold each of the tuning cartridges in its respective socket. Such spring detent fingers 92 may be employed in lieu of the detent clips 89.

In Figure 13, I have illustrated a dummy type of cleaning cartridge, designated 32a, which can be used for cleaning the relatively stationary circuit completing contacts 85 against which the cartridge contacts 74—84 have wiping engagement. This cleaning form of cartridge is constructed with a felt or sponge rubber absorbent face, or an abrasive face, indicated at 95, extending along its outer surface. The absorbent face is adapted to be saturated with a suitable cleaning fluid, such as carbontetrachloride or the like for cleaning and de-greasing the stationary contacts 85. After the cleaning fluid has been applied to the absorbent or abrasive face 95, this cleaning cartridge is inserted into any one of the sockets 31 through the access opening 41, and the turret then revolved through several revolutions to effect a thorough cleaning of the contacts 85. As previously mentioned, this same dummy cartridge, or a separate dummy cartridge, may also be provided with a mildly abrasive face, composed, for example, of a crocus polishing material, for cleaning the stationary contacts 85 by an abrading or polishing action. Obviously, any of the active tuning cartridges may be easily removed for individual cleaning of the contacts in an ordinary manner, without the necessity of any dummy cleaning cartridges, but in order to clean the stationary contacts 85 within the tuner assembly, such dummy cleaning cartridge or cartridges are necessary. By virtue of the fact that the access opening 41 and juxtaposed relation of the sockets 31 enable the cleaning cartridge or cartridges to be inserted without having to open up the cabinet, this cleaning operation can be easily performed by the owner of the television receiver, or by a service man, if desired, without having to remove the receiver to a service shop. This matter of cleaning television tuner contacts has heretofore been an extremely vexatious and troublesome service problem. The heat generated within the television cabinet induces circulatory or rising currents of air which carry dirt and grease contamination to the contacts, and the contact problem is aggravated by the relatively feeble voltages and high frequencies prevailing at the television tuner.

In Figure 14, I have diagrammatically illustrated the RF amplifier, oscillator and mixer circuits constituting the "front end" of a typical television receiver of the step-by-step channel switching type (rather than of the continuous-tuning type), this diagram serving to illustrate the electrical connections established with the contacts 74—78 and 79—84 of each tuning cartridge, in one embodiment of my improved television tuner. The center tapped coil 65 connected to contacts 74, 75 and 76 constitutes a primary coil for connection to the television antenna, and the companion coil 66 connected to contacts 77 and 78 constitutes a secondary coil for connection to the grid of the RF amplifying tube 98. Referring now to the interstage coils, the RF plate coil 70 is connected through contacts 79 and 80 with the plate circuit of the tube 98; the mixer grid coil 71 is connected through contacts 81 and 82 with the mixer grid circuit of the combined oscillator-mixer tube 99; and the oscillator coil 72 is connected through contacts 83 and 84 with the oscillator half of the tube 99. The RF amplifying tube is typically represented by a 6AG5, and the combined oscillator-mixer tube is typically represented by a 6J6, but it will be understood that these tubes are merely representative of any appropriate tubes suitable to such uses.

It will be understood that the RF amplifier, and oscillator and mixer circuits, shown in Figure 14, amplify and convert the high signal frequency to a lower or intermediate frequency for better amplification and band-width characteristics. The manner in which the intermediate frequency output is transmitted on through the sound and video channels of the receiver will be well understood by those skilled in the art. The tuner circuit shown in Figure 14 is typically represented by such circuits used in current television receivers, but my improved tuner is, of course, not limited to any particular receiver or circuit. It will be seen that when new or additional tuning cartridges 32 are substituted or added to the turret through the access opening 41, and the turret then revolved to bring such new or substituted tuning cartridge into engagement with the relatively stationary circuit completing contacts 85, the same circuits traced above are then completed for that particular tuning cartridge and that new or additional television channel thus added to the receiver.

I also contemplate as a further modification of my invention an arrangement wherein the rotatable tuning turret 23 is disposed upright on a substantially vertical axis, with the cartridge receptacle open at the top or bottom, like the openings in a poker-chip holder. The access opening 41 and trap door 42 could then be disposed in the top or bottom of the cabinet or in some offset horizontal level. In any of these embodiments, the door 42 may be made ornamental in appearance or might be camouflaged with ornamentation or made a part of the cabinet design, so that the presence of the door is not apparent or not objectionable.

The outer end of each tuning cartridge 32 may be provided with an indicator plate or escutcheon on which the owner of the set can write channel numbers or station call letters, or into which he can insert a printed card.

Figures 15, 16:
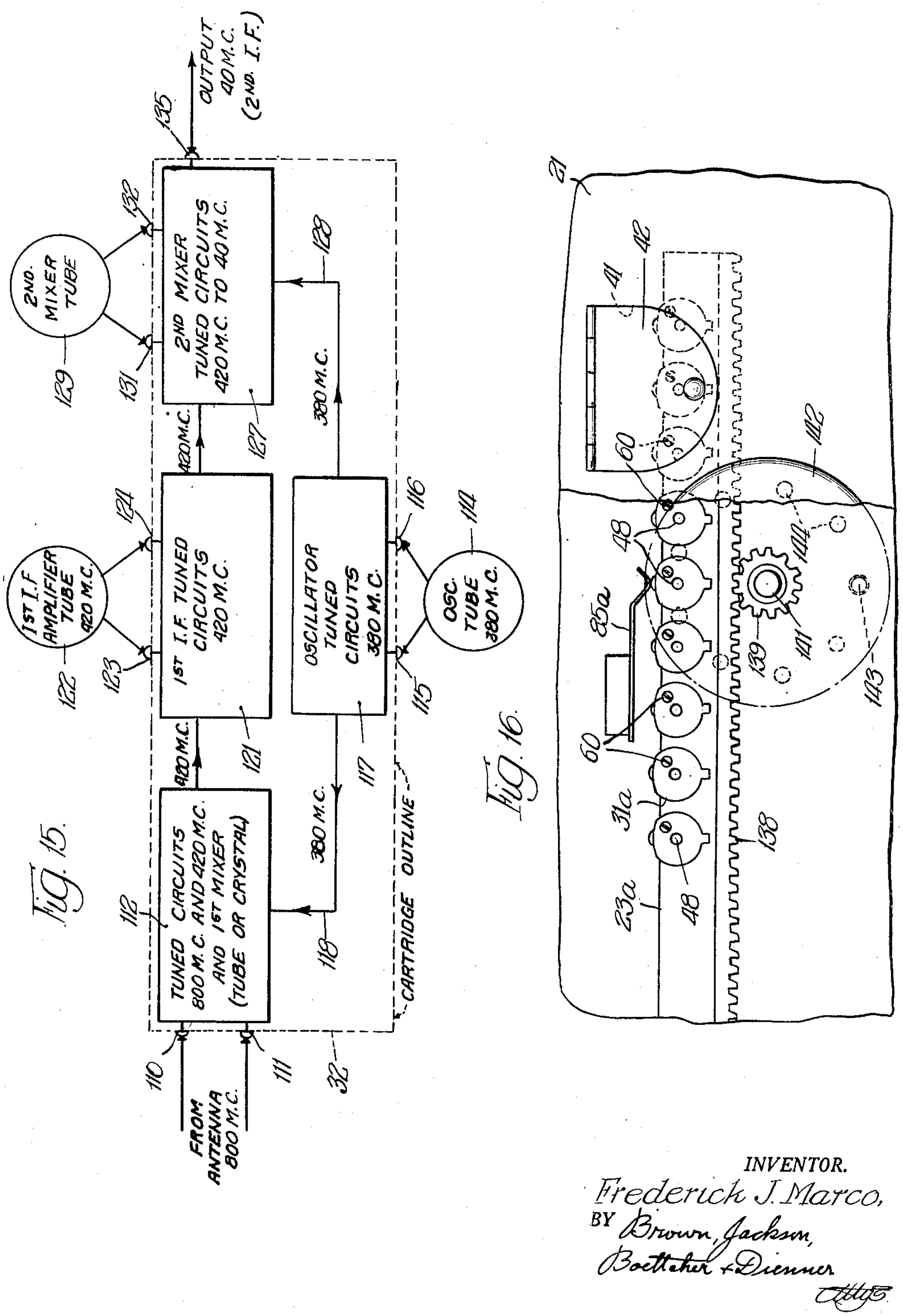
Figure 15 is a schematic block diagram of a modified embodiment of tuning cartridge and associated apparatus, particularly adapted for use on the ultra-high frequency channels.
Figure 16 is a fragmentary front view illustrating a modified carrier having rectilinear motion.

In Figure 15, I have illustrated a further embodiment of my invention in which the above described tuning cartridges 32 are made to contain mixers, mixer tuned circuits, oscillator tuned circuits, etc., for the purpose of obtaining shorter lead lengths and avoiding or minimizing contact switching troubles, particularly at the ultra-high frequencies. For example, this latter embodiment of my invention is particularly adapted for proposed new television channels in the ultra-high frequency bands ranging up to 800 megacycles or even higher. However, it will be understood that this latter embodiment is not limited to use in these ultra-high frequency channels. To facilitate the description of one of these latter tuning cartridges, it will be assumed that a new television channel has been opened up in the 800 mc. band, and that it is desired to adapt the above described television tuner to that channel. This signal frequency is brought in from the television antenna by coaxial cable, wave guide, transmission line, or the like, and is applied through the stationary contacts 85 to a pair of contacts 110 and 111 on the tuning cartridge, preferably located adjacent to one end thereof. These contacts have electrical connection with the input end of tuned circuits and a first mixer, indicated in their entirety in schematic block form at 112. These tuned circuits and first mixer are contained entirely within the tuning cartridge 32, and perform the first conversion, mixing or heterodyning operation of a two-step converting operation for bringing the 800 mc. signaling frequency down to a 40 mc. intermediate frequency. This first mixer of the RF input end 112 might be a thermionic diode, triode or pentode, or more appropriately, it might be a crystal mixer suitable for that purpose, such as germanium, silicon, or the like, functioning as a rectifying or mixing diode.

An oscillator frequency, for heterodyning against the 800 mc. signal frequency, is generated in a local oscillator tube 114 which can be located exterior of the tuning cartridge 32 and connected therewith through contacts 115 and 116 on the cartridge. These contacts connect with tuned circuits for the local oscillator tube, such tuned circuits being shown in schematic block form at 117. For the purpose of illustrating a two-step conversion, I have chosen a local oscillator frequency of 380 mc., but it will be understood that this is merely exemplary. This local oscillator frequency is conducted from the oscillator tuned circuit network 117 over a first path 118 to the above described first mixer 112, where the mixing of the two frequencies produces sum and difference frequencies in a well known manner. The difference frequency of 420 mc. is now conducted to a first IF tuned circuit network, indicated in block diagram form at 121, also contained within the interchangeable tuning cartridge 32. These first IF tuned circuits 121 are connected with a first IF amplifier tube or other appropriate amplifying instrumentality, indicated schematically at 122, which may be located exterior of the tuning cartridge, although it might be contained therein. When thus located exterior of the tuning cartridge, it has connection with the first IF tuned circuits through the cartridge contacts 123, 124. This first intermediate frequency of 420 mc., as thus amplified at 121—122, is then transmitted to a second mixer tuned circuit network indicated in block diagram form at 127, these second mixer tuned circuits also being contained within the tuning cartridge 32. The local oscillator frequency of 380 mc. is also conducted from the oscillator tuned circuit network 117 over a second path 128 to the second mixer tuned circuit network 127, but, it will be understood that a separate oscillator could also be used for this purpose, if desired. Associated with the network 127 is a second mixer tube 129 which may be located either inside or outside of the tuning cartridge 32. When located outside of the tuning cartridge, it is connected with the second mixer tuned circuits 127 through cartridge contacts 131, 132. The second conversion step occurs in 127, 129, where the first intermediate frequency of 420 mc. is mixed with the local oscillator frequency of 380 mc. to produce sum and difference frequencies. The difference frequency of 40 mc. is then taken as an output frequency from the tuning cartridge 32 through cartridge contact 135, and this 40 mc. output frequency constitutes a second intermediate frequency which is then transmitted through the intermediate frequency channel or channels of the television receiver in a manner well known. Different tuning cartridges 32 for other signal frequencies in the ultra-high frequency range would have different values in the RF tuned circuits and first mixer network 112, appropriate to these other signal frequencies, and might also have different local oscillator frequencies and different tuned circuit networks 121, 127. These different tuning cartridges for the ultra-high frequency channels would be inserted into and removed from the turret sockets 31 through the access opening 41 in the same manner described above in connection with Figures 1–12.

In Figure 16, I have illustrated a further modification of my invention wherein the carrier for the tuning cartridges has a rectilinear instead of a rotary motion. In this embodiment the carrier is in the form of a long plate or bar 23*a*, in one face of which are formed the cartridge receptacles 31*a*. In the rectilinear motion of this plate, the contacts 74—84 of the successive tuning cartridges are successively presented to the bank of relatively stationary circuit completing contacts 85*a*. This rectilinear motion is imparted to the plate by a toothed rack 138 and pinion 139, the rack being secured to the under side of the plate, and the pinion being secured to the shaft 141 of the tuning knob 142. The tuning knob can be yieldingly held in each channel selecting position by a spring pressed ball or like detent 143 snapping into depressions 144 in the back face of the knob. The access opening 41 and cover 42 are preferably disposed in close proximity to the knob 142 so as to minimize the degree of travel of the plate in each direction for presenting each of the receptacles to the opening.

Figures 17, 18, 19:
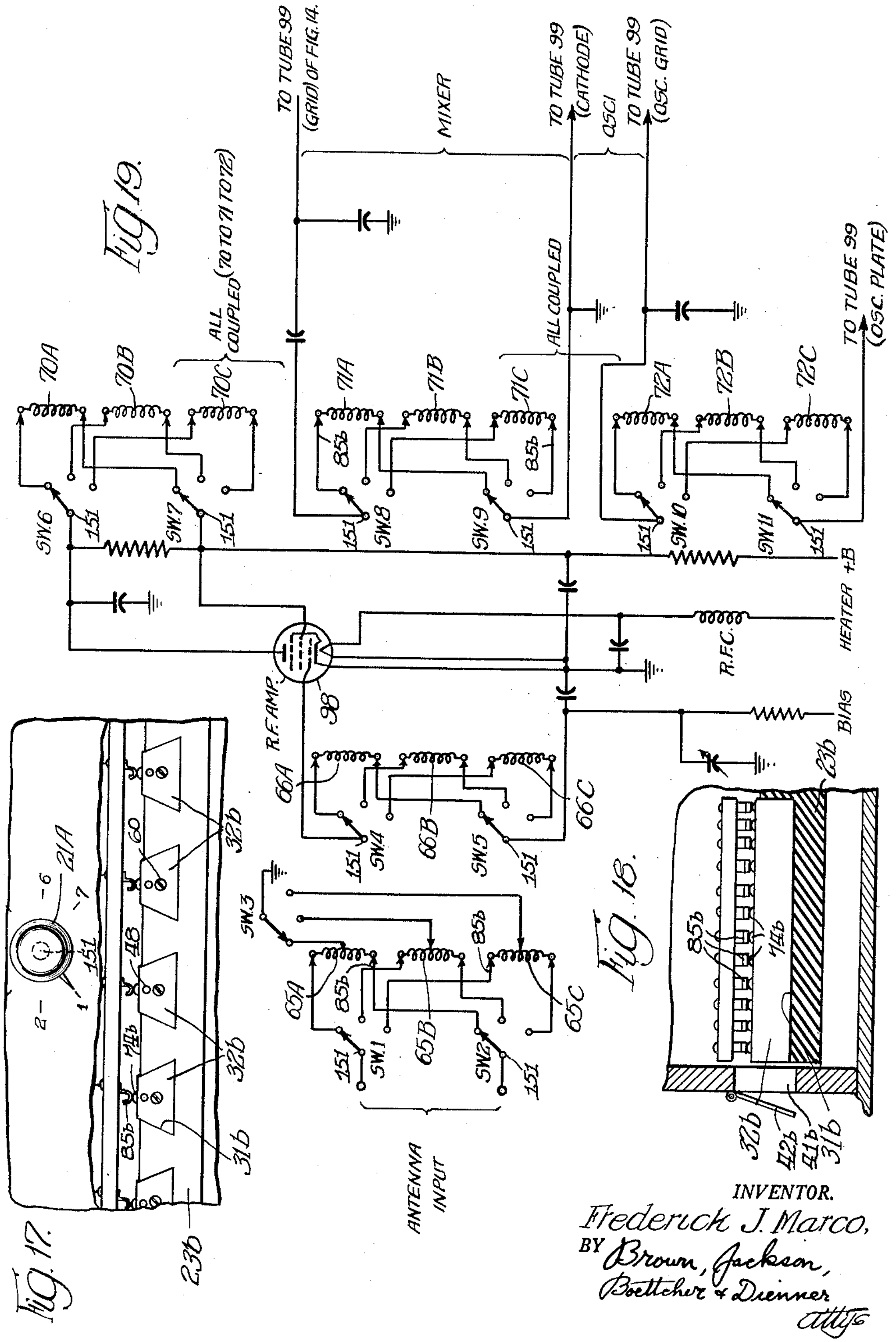
Figure 17 is a fragmentary front view, partly broken away, of a modified embodiment employing a stationary carrier or holder for the tuning cartridges.
Figure 18 is a fragmentary sectional view taken at right angles to Figure 17.
Figure 19 is a circuit diagram showing one embodiment of circuit and switching apparatus for use with this stationary carrier or holder.

My invention also contemplates an arrangement wherein the tuning cartridge receptacles 31 remain in stationary positions, and the successive switching of the cartridges into circuit for channel selection is performed either by rotary or slide switches having a multiplicity of contacts, or by a push-button arrangement of switches. Such an arrangement is illustrated in Figures 17, 18 and 19. The tuning cartridges, designated 32*b*, are mounted in a stationary carrier or holder 23*b* in which are formed the cartridge receptacles 31*b* for receiving the tuning cartridges 32*b*. In this embodiment, I have shown the cartridges 32*b* as being of trapezoidal cross-section for reception in trapezoidal sockets 32*b*, and this trapezoidal, hexagonal, square or other polygonal cross-section may be employed in lieu of the circular cross-section in any of the previously described embodiments, if desired. In this stationary embodiment, the row of contacts on each tuning cartridge, indicated collectively at 74*b*, are adapted to engage with a row of stationary contacts, indicated collectively at 85*b*, there being a row of such stationary contacts for each cartridge receptacle 31*b*. The access opening 41*b* and closure 42*b* are made sufficiently long to afford access to all of the receptacles 31*b*. Each cartridge has a threaded opening 48 in its end or other arrangement for reception of a suitable tool, as previously described.

Referring now to the circuit diagram of Figure 19, which is electrically similar to that much of the circuit diagram that leads up to the combined oscillator-mixer tube 99 in Figure 14, the channel selecting operation in this latter embodiment is performed by a series of switches designated SW1 to SW11 inclusive. These switches are shown as being of the rotary type ganged for operation from a single rotary shaft 151 which is adapted to be rotated by a tuning knob 21A, but the switches might be of the slide or push-button type, if desired. For simplicity of illustration, I have only shown three channels of reception in the circuit diagram of Figure 18, but it will be understood that the same principle can be expanded to any number of channels that are desired. Each of the inductances 65—66 and 70, 71 and 72 of Figure 14 is shown as having three counterparts 65A, 65B, 65C—72A, 72B, 72C of slightly different inductances in Figure 19 for the step-by-step selection of three different channels. The above described stationary contact wipers, collectively indicated at 85b, are permanently wired to the stationary contacts of the switches SW1—SW11, so that the circuits of any individual tuning cartridge 32b may be selectively connected to the vacuum tubes 98 and 99. The substitution or addition of different or new tuning cartridges 32b in the stationary carrier or holder 23b will be obvious from the preceding description.

While I have illustrated and described what I regard to be the preferred embodiments of my invention, nevertheless it will be understood that such are merely exemplary and that numerous modifications and rearrangements may be made therein without departing from the essence of the invention.

I claim:

1. In a television receiver having an enclosing housing, the combination of a channel selecting tuning apparatus in said housing comprising a rotatable turret having a plurality of sockets spaced around its periphery, said sockets having entrance openings in one end of said turret, channel selecting tuning cartridges of long, narrow form adapted to be inserted endwise into said sockets through said entrance openings, the rotary step-by-step motion of said turret carrying each of said sockets into a cartridge receiving position where a cartridge can be inserted into that socket, and also into a channel selecting position where the cartridge in that socket is operative to effect and complete a channel selection, each of said tuning cartridges having enclosed tuning inductances and terminal contacts therefor arranged longitudinally along an exterior surface of the tuning cartridge, coacting keying surfaces in said sockets and on said cartridges for locking said cartridges in proper position in said sockets with said terminal contacts projecting substantially peripherally from the turret, a tuning knob operable from the exterior of said housing for rotating said turret to carry each of its sockets into said cartridge receiving position and into said channel selecting position, relatively stationary circuit completing contacts in said housing adapted to be engaged by the terminal contacts of said tuning cartridges for completing channel selecting circuits when each tuning cartridge is moved into the channel selecting position by rotation of said turret, and an access opening in said housing aligned with said cartridge receiving position of said turret and with the socket entrance opening in the end of said turret then in registry with said cartridge receiving position, through which access opening said tuning cartridges can be inserted endwise into and removed from said sockets, said access opening being relatively small and serving to guide the inserted cartridge endwise into the socket in said cartridge receiving position, said cartridge receiving position being separate from said channel selecting position so that when the cartridges are being inserted into said sockets they will not at that time encounter said stationary contacts.

2. In a television receiver having an enclosing housing, the combination of a channel selecting tuning apparatus comprising a rotatable turret in said housing having a plurality of peripherally spaced cartridge holding means defining a plurality of peripherally spaced cartridge-receiving stations around said turret, a tuning knob operable from the exterior of said housing for rotating said turret with a step-by-step motion, an access opening in said housing adjacent to said turret, channel selecting tuning cartridges of long narrow form adapted to be inserted substantially endwise through said access opening into said cartridge-receiving stations on said turret to be held there by said cartridge holding means, the rotary step-by-step motion of said turret carrying each of its cartridge-receiving stations selectively into a predetermined cartridge receiving position located adjacent to said access opening, through which access opening any selected cartridge can be inserted into any selected cartridge-receiving station in which it is held by said cartridge holding means, said access opening being relatively small and serving to indicate the proper station to receive the inserted cartridge, the rotary step-by-step motion of said turret also carrying each of the cartridges in said stations into a contact-making channel selecting position where the cartridge at that station is operative to effect and complete a channel selection, each of said cartridges comprising preadjusted reactances tuned for the reception of the television channel and having terminal contacts therefor arranged longitudinally along an exterior surface of the tuning cartridge, relatively stationary circuit completing contacts in said housing adapted to electrically engage the terminal contacts of said tuning cartridges when each tuning cartridge is moved into said contact-making channel selecting position, said cartridge receiving position being separate from said contact-making channel selecting position so that when the cartridge is being inserted into one of said cartridge-receiving stations it cannot at that time encounter said stationary contacts.

FREDERICK J. MARCO.

References Cited in the file of this patent

UNITED STATES PATENTS

| Number | Name | Date |
|---|---|---|
| 1,678,032 | Bergman | June 24, 1928 |
| 2,103,035 | Lear | Dec. 21, 1937 |
| 2,496,183 | Thias | Jan. 31, 1950 |

FOREIGN PATENTS

| Number | Country | Date |
|---|---|---|
| 355,180 | Great Britain | Aug. 20, 1931 |
| 435,255 | Great Britain | Sept. 12, 1935 |

OTHER REFERENCES

Short Wave Craft, August 1934, page 220, article: "Switching Those S-W Coils."